Jan. 30, 1968     I. H. BIRCH     3,366,042
HOT DIE EMBOSSING MACHINE FOR MARKING STRIP MATERIAL
Filed July 6, 1965
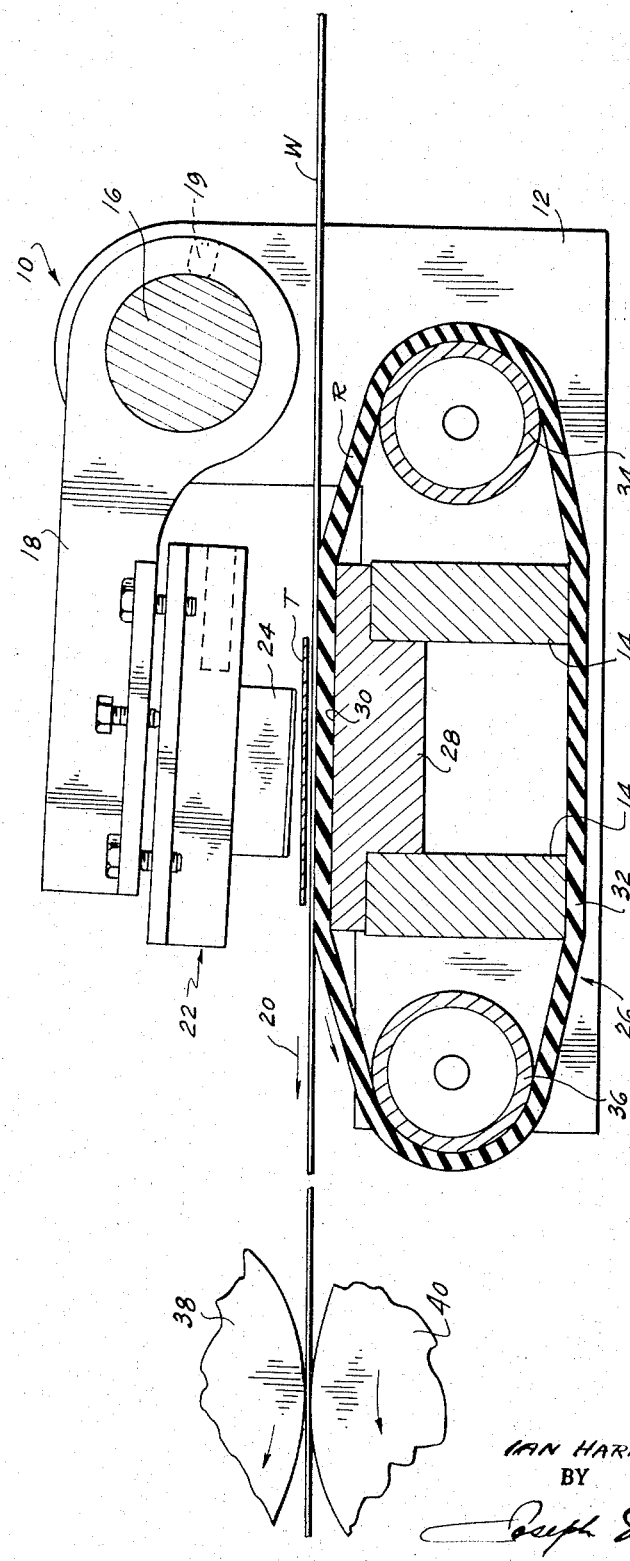
INVENTOR.
IAN HARRY BIRCH
BY
*Joseph Montgomery*
ATTORNEY 3,366,042
HOT DIE EMBOSSING MACHINE FOR MARKING STRIP MATERIAL
Ian Harry Birch, Ealing, England, assignor to Adolph Gottscho, Inc., Hillside, N.J., a corporation of New York
Filed July 6, 1965, Ser. No. 469,433
5 Claims. (Cl. 101—27)

ABSTRACT OF THE DISCLOSURE

There is disclosed in this application a machine for marking a web of plastic or other sheet material by stamping a design from a hot roll leaf stamping tape, both the stamping tape and the sheet material being intermittently advanced and the heated die being operated to press the tape against the sheet material and both against a back-up platen while the tape and sheet are at rest. The web of sheet material is prevented from adhering to the fixed platen by means of an endless belt which overlies the platen and which can travel with the web of sheet material, the belt diverging from the path of the web so that the web is peeled from the belt and damage to the web which occurred in the past when the stationary platen was used alone, is eliminated or materially reduced.

---

This invention relates generally to marking apparatus, and more particularly is directed to improvements in marking apparatus of the kind wherein the desired marking or imprint is applied to a web of plastic or other glossy sheet material from a hot roll leaf stamping tape by pressing a heated die against the latter.

In marking apparatus of the kind mentioned above, for example, in apparatus as disclosed in U.S. Patent No. 3,022,724, issued Feb. 27, 1962, to Francis C. Worth, the plastic or other glossy-surfaced web to be marked is intermittently advanced over a fixed platen or support surface, and a heated die is mounted above the platen and moved cyclically toward and away from the fixed platen in synchronism with the intermittent advancement of the web. Thus, when the web is at rest, the heated die is moved toward the fixed platen so as to apply heat and pressure to a hot roll leaf stamping tape disposed between the die and web for transferring a marking from the tape to the web backed-up by the fixed platen. During each advancement of the web, the heated die is moved away from the fixed platen so as to free the web for such advancement, and further to release the tape so that the latter may undergo a feeding movement for exposing an unused portion of the tape to the action of the heated die during the next marking operation.

It has been found that, when employing apparatus of the described character for the marking of plastic webs, the heat and pressure applied by the die for effecting the transfer of a marking or imprint from the hot roll leaf stamping tape to the web causes sticking or adhering of the web material to the fixed platen. Such adherence is frequently so strong as to resist separation of the marked web from the fixed platen by the pull exerted on the web to effect the advancement thereof following each marking operation, so that tearing or other damage to the web may result, especially when thin webs are being marked.

Accordingly, it is an object of this invention to provide a marking apparatus of the described character with means for supporting or backing-up the web during the marking thereof, and from which the web is easily and smoothly stripped during a subsequent advancement of the web so as to avoid tearing or other damage of the web even when the latter is formed of very thin sheet material.

In accordance with an aspect of this invention, a marking apparatus for applying markings to a web of plastic material pulled intermittently for advancement in a predetermined path, and which is of the type that includes heated die means located at one side of such path and moved cyclically toward the path so as to apply heat and pressure to a hot roll leaf stamping tape disposed between the die means and the web for transferring a marking from the tape to the web when the latter is at rest, and away from such path so as to release the tape and web during advancement thereof, is provided with a device for supporting the web during the transfer of each marking thereto which comprises a fixed platen at the side of the web path opposed to the heated die means and having a support surface which is parallel to the web path at least over the extent of the die means, an endless belt, preferably of rubber or other resilient material, having a run thereof extending across the support surface of the platen to back-up the web during the transfer of a marking thereto and being freely movable with the web during advancement of the latter, and means guiding such run of the belt so as to provide a portion of the run following the platen which diverges from the web path in the direction of advancement of the web, whereby to strip the web from the belt during movement of the belt along such diverging portion of its run.

The above, and other objects, features and advantages of the invention, will be apparent in the following detailed description of an illustrative embodiment thereof which is to be read in connection with the accompanying drawing, wherein the single figure is a sectional view of a device for supporting or backing-up the web in accordance with this invention, which view is taken in a plane parallel to the direction of movement of the web.

Referring to the drawing in detail, it will be apparent that there are shown only those parts of the marking apparatus 10 essential to an understanding of the present invention. The other components of the marking apparatus, which are hereinafter generally mentioned but omitted from the drawing for the sake of clarity, may be constructed in a manner known in the art, for example, as disclosed specifically in U.S. Patent No. 3,022,724, which is identified more fully above.

The marking apparatus 10 is shown to include side frame members 12 mounted in parallel, spaced apart relation at opposite sides of the path of travel of the web W and being joined to each other by laterally extending bars 14 disposed below the web W. A shaft 16 extends laterally between sides frame members 12 above the path of web W and has its ends rotatably mounted in suitable bearings provided in the side frame members. An arm 18 is suitably secured to shaft 16, as by a set screw 19, and extends from the shaft generally in the direction of the intermittent advancement of web W, as indicated by the arrow 20. A heated die assembly generally indicated by the reference numeral 22 is suitably suspended from arm 18 and carries removable type elements 24 which project downwardly therefrom. Since the heated die assembly 22 does not form a part of the present invention, it will not be described in detail, and it is merely indicated that the die assembly includes an electrical heating unit which is thermostatically controlled and which is effective to heat the type elements 24 corresponding to the desired marking to be applied to the web W.

Underlying the web W in the region where the latter is to be marked is the web supporting device embodying this invention and which is generally identified by the reference numeral 26. As shown, the device 26 includes a fixed platen 28 suitably mounted on bars 14 and presenting a support surface 30 which is parallel to the path of web W at least over the extent of the type elements 24 carried by die assembly 22. The support or back-up device 26 further includes an endless belt 32 running around guiding rollers 34 and 36 respectively disposed in front and in back of fixed platen 28 and being freely rotatably supported by side frame members 12. The upper run R of belt 32 extends from roller 34 across the support surface 30 of platen 28 to roller 36 and is engageable with the underside of web W where the latter extends over platen 28.

In accordance with the present invention, at least the roller 36 which is disposed in back of platen 28 is located relative to the latter so that the portion of the belt run R extending from support surface 30 to the periphery of roller 36 diverges from the path of the web W in the direction of the advancement of the latter. As shown, the divergence of the belt run R from the path of web W following the support surface 30 may be achieved by spacing roller 36 from platen 28 in the direction of movement of the web, and by spacing the periphery of roller 36 from the path of the web by a distance that is substantially greater than the distance from the surface 30 to the path of the web.

It will be apparent that rocking of the shaft 16 is effective to raise and lower the heated die assembly 22 with respect to the portion of belt run R running across platen 28. Rocking of shaft 16 may be effected by suitable devices which form no part of the present invention and hence are not described in detail or shown on the drawing. However, such devices synchronize the rocking of shaft 16 with the intermittent advancement of the web W so that shaft 16 is rocked in the counter-clockwise direction to lower the heated die assembly 22 when the web is at rest and in the clockwise direction for raising the heated die assembly during each advancement of the web. As shown schematically on the drawing, the intermittent advancement of the web may be effected by a pull exerted thereon by drive rolls 38 and 40 which are intermittently rotated or intermittently moved into driving engagement with the web at a location along the web spaced from the marking apparatus 10 in the direction of movement of the web indicated by arrow 20. The drive rolls 38 and 40 may be included in a wrapping or other machine which utilizes the web W following the marking thereof.

The type assemblies 24 of the heated die assembly 22 subject a hot roll leaf stamping tape, generally indicated at T, to heat and pressure during each marking operation to effect the transfer of pigment from the tape T to the underlying web W which is supported or backed-up by the belt 32 resting on support surface 30 of platen 28, thereby to provide a permanent and clear marking on the web. In order to insure that the successive applied markings are all of uniform intensity, an unused area of the tape T is exposed to the action of the type elements 24 during each of the successive marking operation. The exposure of an unused portion of the tape T to the action of the type elements during each marking operation may be achieved by laterally feeding the tape across the path of movement of the web W during each period or interval between successive marking operations when the type elements are elevated or raised. Since the feeding of the tape T forms no part of the present invention, mechanisms suitable for that purpose are neither described in detail herein nor shown in the drawing.

When the heated die assembly 22 is moved downwardly during each marking operation so that the type elements 24 apply heat and pressure to the tape T for effecting the transfer of pigment from the tape to the underlying web W supported by the belt 32 on the surface 30 of platen 28, such heat and pressure may cause adherence or sticking of the web W to the belt. When the die assembly 22 is raised and the web W is pulled by drive rolls 38 and 40 so as to be advanced in the direction of arrow 20, the run R of belt 32 adhering to the web is moved in the same direction. However, as each increment of the belt arrives at the end of support surface 30 closest to guide roller 36, that increment of the belt moves in a diverging or downwardly inclined direction with respect to the direction of the path of the web so that the pull exerted on the web serves to progressively strip or separate the latter from the surface of belt 32. Since belt 32 is free to move with the web W during the described progressive stripping action, the resistance to movement of the web by reason of its adherence to the belt 32 is minimized, thereby to avoid tearing or other damage to the web even when the latter is of very thin material.

The belt 32 is preferably formed of a resilient material so as to provide a cushioned back-up surface for the web W under the type elements 24 during each marking operation for ensuring clear or sharp transfers of the markings to the web. A suitable resilient material for the belt 32 is natural or synthetic rubber, preferably silicon rubber or rubber having a silicon coating on the surface of the belt 32 which comes in contact with the underside of the web W, thereby to further minimize the sticking of the web to the belt.

Although an illustrative embodiment of this invention has been described in detail herein with reference to the drawing, it is to be understood that the invention is not limited to that precise embodiment, and that various changes and modifications may be effected therein by one skilled in the art without departing from the scope or spirit of the invention, except as defined in the appended claims.

What is claimed is:

1. In a marking apparatus for applying markings to a web of sheet material pulled intermittently for advancement in a predetermined path, and which includes heated die means located above said path and moved cyclically toward said path so as to apply heat and pressure to a hot roll leaf stamping tape disposed between the die means and the web for transferring a marking from the tape to the web when the latter is at rest, and away from said path so as to release the tape and web during advancement thereof;

a device for supporting the web during the transfer of each marking thereto comprising a fixed platen beneath said path having a support surface which is parallel to said path at least over the extent of said die means, a pair of freely rotatable rollers one at each end of said platen in the direction of movement of said web, an endless belt supported on said rollers and having a run thereof extending across said support surface of the platen to back-up the web during the transfer of a marking thereto, and means guiding said run of the belt so as to provide a portion thereof following said support surface of the platen which diverges downwardly from said path of advancement of the web, whereby to strip the web from the belt immediately following the transfer operation.

2. Marking apparatus as in claim 1; wherein at least said roller following said guide means is being spaced from said support surface of the platen in the direction of advancement of the web in said path and having the periphery of said roller spaced from said path by a distance substantially greater than the distance of said support surface from said path.

3. Marking apparatus as in claim 1; wherein said guide means includes freely rotatable rollers having their axes extending laterally with respect to said path and being disposed respectively in front and in back of said fixed platen considered in the direction of said advancement of the web, said belt runs around said rollers, and at least said roller which is disposed in back of the platen has its periphery spaced from said path by a distance substantially greater than the distance of said support surface from said path.

4. Marking apparatus as in claim 1; wherein said belt is a silicon rubber.

5. Marking apparatus as in claim 1; wherein said belt is rubber with a silicon coating at the surface of the belt which faces said path of the web when traveling along said run of the belt.

References Cited

UNITED STATES PATENTS

| | | | |
|---|---|---|---|
| 2,043,432 | 6/1936 | Flood | 101—32 |
| 2,156,383 | 5/1939 | Ferla | 101—3 |
| 2,983,175 | 2/1957 | Smith et al. | 101—32 |
| 3,022,724 | 2/1962 | Worth | 101—27 |
| 3,024,154 | 3/1962 | Singleton et al. | 101—32 |
| 3,217,638 | 11/1965 | Gottscho | 101—27 |

WILLIAM B. PENN, *Primary Examiner.*